(12) United States Patent
Woo et al.

(10) Patent No.: US 8,947,213 B2
(45) Date of Patent: Feb. 3, 2015

(54) METHOD AND SYSTEM FOR CONFIRMING LOCATION OF PRODUCT WITHIN SHELF USING RFID

(75) Inventors: Yong-Ho Woo, Seoul (KR); Ju-Ho Lee, Yongin-si (KR); Ji-Eun Kim, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 0 days.

(21) Appl. No.: 13/576,058

(22) PCT Filed: Jan. 24, 2011

(86) PCT No.: PCT/KR2011/000460
§ 371 (c)(1),
(2), (4) Date: Jul. 30, 2012

(87) PCT Pub. No.: WO2011/093619
PCT Pub. Date: Aug. 4, 2011

(65) Prior Publication Data
US 2012/0306624 A1    Dec. 6, 2012

(30) Foreign Application Priority Data
Jan. 29, 2010 (KR) .................. 10-2010-0008334

(51) Int. Cl.
*H04Q 5/22* (2006.01)
*G06Q 10/08* (2012.01)

(52) U.S. Cl.
CPC .................................. *G06Q 10/087* (2013.01)
USPC ..................... 340/10.5; 340/568.8; 340/572.4

(58) Field of Classification Search
CPC ....... G06K 7/00; G06K 7/008; G06Q 10/087; G06Q 30/02; G06Q 30/06
USPC ......................... 340/10.1–10.6, 568.1–572.9
See application file for complete search history.

(56) References Cited

U.S. PATENT DOCUMENTS

| 5,841,365 A | * | 11/1998 | Rimkus ................... 340/5.61 |
| 8,022,809 B2 |   | 9/2011  | Flores et al. |

(Continued)

FOREIGN PATENT DOCUMENTS

| EP | 1501034 A1 | * | 1/2005 | .............. G06F 17/60 |
| EP | 1762959 A2 | * | 3/2007 | .............. G06K 7/00 |
| EP | 1145189 B1 | * | 5/2008 | .............. G06K 17/00 |
| EP | 1950686 A2 | * | 7/2008 | .............. G06K 7/00 |

(Continued)

OTHER PUBLICATIONS

International Search Report dated Oct. 10, 2010 issued in International Application No. PCT/KR2011/000460.

*Primary Examiner* — Hai Phan
*Assistant Examiner* — Orlando Bousono
(74) *Attorney, Agent, or Firm* — Sughrue Mion, PLLC

(57) ABSTRACT

Present invention relates to method for confirming location of product using RFID. Method for confirming location of product on a shelf in a product location confirmation system including: a plurality of shelf areas; a location tag which is provided at each shelf and transmits an RFID signal; a reader which is provided at each shelf and reads the RFID signal; and a server for analyzing the information collected through the reader comprises the steps of: the reader confirming whether a location tag signal is received; the server determining the absence of the product on the corresponding shelf when the location tag signal is received; the reader confirming whether a product tag signal as the RFID signal transmitted from the product is received when the location tag signal is not received; and the server determining the presence of the product within the corresponding shelf when the product tag signal is received.

21 Claims, 3 Drawing Sheets

(56) References Cited

U.S. PATENT DOCUMENTS

| | | | |
|---|---|---|---|
| 2005/0099298 A1* | 5/2005 | Mercer et al. | 340/572.1 |
| 2006/0015408 A1* | 1/2006 | Brown | 705/22 |
| 2006/0214792 A1* | 9/2006 | Goyal et al. | 340/572.1 |
| 2007/0013526 A1* | 1/2007 | Kazdin et al. | 340/573.4 |
| 2007/0057774 A1* | 3/2007 | Kawamata | 340/10.51 |
| 2008/0284600 A1* | 11/2008 | Drzaic et al. | 340/572.1 |

FOREIGN PATENT DOCUMENTS

| | | | | |
|---|---|---|---|---|
| EP | 2067272 B1 | * | 8/2010 | G06K 7/00 |
| JP | 2005235180 A | * | 9/2005 | G06K 17/00 |
| JP | 200636428 A | | 2/2006 | |
| KR | 1020090028029 A | | 3/2009 | |
| KR | 1020090036288 A | | 4/2009 | |
| KR | 1020090085910 A | | 8/2009 | |
| KR | 1020090131785 A | | 12/2009 | |

* cited by examiner

US 8,947,213 B2

METHOD AND SYSTEM FOR CONFIRMING LOCATION OF PRODUCT WITHIN SHELF USING RFID

PRIORITY

This application is the National Stage of International Application No. PCT/KR2011/000460, filed Jan. 24, 2011, and this application claims the benefit under of a Korean patent application filed in the Korean Intellectual Property Office on Jan. 29, 2010 and assigned Serial No. 10-2010-0008334, the entire disclosure of which is hereby incorporated by reference.

BACKGROUND OF THE INVENTION

1. Field of the Invention

The present invention generally relates to a method of confirming a location of a product using an RFID, and more specifically, to a method of confirming information on whether a product is loaded on a shelf, a specific location, and a status thereof using an RFID.

2. Description of the Related Art

In general, product management services refer to services in which a plurality of shelves are provided, and products are stored and managed on each shelf In order to provide the product management services, precise information on which shelf is loaded with products is required. For this purpose, conventionally, products were located on shelves and data was manually input or barcodes attached to the products were read to perform operations such as reading locations of the shelves or mapping thereto. This is inconvenient in that it causes data to be manually recorded, and operations to be performed twice.

Attempts have been made to overcome the conventional problems. For example, attempts have been made to manage products located on a shelf using a radio-frequency identification (RFID) technique. However, a conventional method of confirming a location of a product on a shelf using an RFID causes a malfunction such as a reader reading information on a product on a next shelf to occur, and thus an apparatus interrupting a radio wave was required to be additionally installed in each shelf.

SUMMARY OF THE INVENTION

An aspect of the present invention is to address at least the above mentioned problems and/or disadvantages and to provide at least the advantages described below. Accordingly, an aspect of the present invention is to provide a method and system for confirming locations of products loaded on a shelf that is capable of facilitating the confirmation of locations of the loaded products and information thereof using an RFID without installing an additional apparatus.

The above aspects are achieved by providing a method of confirming a location of a product on a shelf in a system for confirming a location of a product including a plurality of shelf areas, a location tag included in each shelf and storing locations of the shelves, a reader included in each shelf and reading an RFID signal and an RFID server analyzing information collected by the reader. The method includes the reader confirming whether or not a location tag signal is received, the RFID server determining that no product is on the corresponding shelf when the location tag signal is received, the reader confirming whether or not a signal of the product tag included in a product to transmit an RFID signal is received when the location tag signal is not received, and the RFID server determining that a product is on the corresponding shelf when the signal of the product tag is received.

The method may further include the RFID server determining that an error occurs in the reader when the signal of the product tag is not received.

In an exemplary embodiment of the present invention, the reader located in the shelf may be prevented from reading the location tag located in the shelf when a product is located on the shelf.

In the method of confirming a location of a product on a shelf in the system for confirming a location of a product on a shelf including a first shelf and a second shelf adjacent to each other, a first reader located in the first shelf, a first location tag located in the first shelf, a second reader located in the second shelf, and a second location tag located in the second shelf, the RFID server may determine that no product is on the first shelf when the first reader reads a signal of the first location tag but is unable to read a signal of the second location tag.

The RFID server may determine that no product is on the first shelf when the first reader reads the signals of the first and second location tags. Here, the RFID server may reduce the intensity of an emitted radio wave of the first reader until the signal of the second location tag is not recognized. In an exemplary embodiment of the present invention, the RFID server may gradually reduce the intensity of the emitted radio wave of the first reader to the intensity of a predetermined radio wave.

The RFID server may cause an alarm to be output when the first reader recognizes the signal of the second location tag even when the intensity of the emitted radio wave of the first reader reaches the minimum.

The RFID server may determine that an error occurs in the first location tag when the first reader is unable to read the signal of the first location tag but reads the second location tag signal.

The RFID server may determine that an error occurs in the first reader when the first reader is unable to read the signals of the first and second location tags.

The RFID server may determine that an error occurs in the second location tag when the second reader reads the signal of the first location tag but is unable to read the signal of the second location tag.

The RFID server may determine that no product is on the second shelf when the second reader reads the signals of the first and second location tags. Here, the RFID server may reduce the intensity of an emitted radio wave of the second reader until the signal of the first location tag is not recognized. In an exemplary embodiment of the present invention, the RFID server may gradually reduce the intensity of the emitted radio wave of the second reader to the intensity of a predetermined radio wave.

The RFID server may cause an alarm to be output when the second reader recognizes the signal of the first location tag even when the intensity of the emitted radio wave of the second reader reaches the minimum.

The RFID server may determine that no product is on the second shelf when the second reader is unable to read the signal of the first location tag but reads the signal of the second location tag.

The RFID server may determine that an error occurs in the second reader when the second reader is unable to read the signals of the first and second location tags.

The RFID server may determine that a product is on the first shelf when the first reader reads the signal of the product tag located in the product but is unable to read the signal of the second location tag.

The RFID server may determine that a product is on the first shelf when the first reader reads the signal of the product tag located in the product and the signal of the second location tag.

The RFID server may determine that a product is on the second shelf when the second reader reads the signal of the product tag located in the product but is unable to read the signal of the first location tag.

The RFID server may determine that a product is on the second shelf when the second reader reads the signal of the product tag located in the product and the signal of the first location tag.

One aspect of the present invention provides a system for confirming a location of a product on a shelf The system for confirming a location of a product on a shelf according to an exemplary embodiment of the present invention includes a plurality of shelf areas, a location tag included in each shelf and transmitting an RFID signal, a reader included in each shelf and reading the RFID signal, and an RFID server analyzing data collected by the reader and including an operating system facilitating operations of the system, an RFID middleware for analyzing and refining the data collected by the reader, and an application for using the data refined and analyzed through the RFID middleware.

The reader and the location tag located in each shelf may be mapped to each other to be managed.

The RFID server may determine that no product is on the corresponding shelf when the reader receives a location tag signal.

The RFID server may determine that a product is on the corresponding shelf when the reader is unable to receive the location tag signal but receives the signal of the product tag included in the product to transmit an RFID signal.

The RFID server may determine that an error occurs in the reader when the reader is unable to receive the signals of the location and product tags.

In an exemplary embodiment of the present invention, the reader located in the shelf may be prevented from reading the location tag located in the shelf when a product is on the shelf.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

DETAILED DESCRIPTION OF EXEMPLARY EMBODIMENTS

Figure 1:
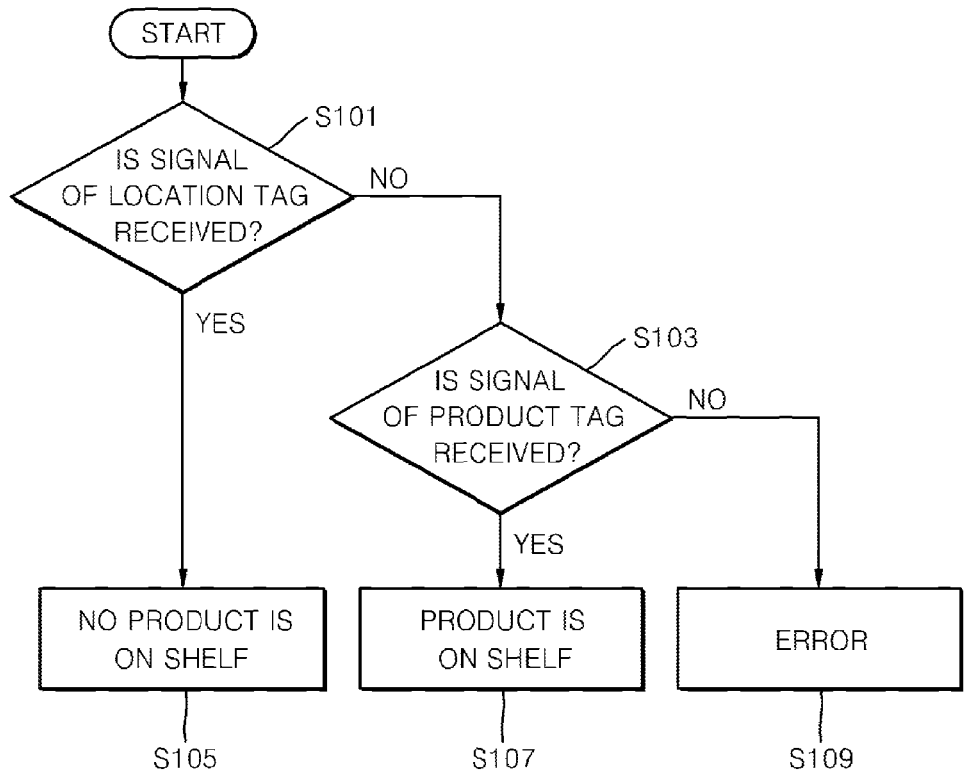
FIG. 1 is a flowchart illustrating a method of confirming a location of a product in a system for confirming a location of a product using an RFID according to an exemplary embodiment of the present invention.

Hereinafter, exemplary embodiments of the present invention will be described in detail with reference to the accompany drawings. First, in adding reference numerals to elements in each drawing, when an element of the inventive disclosure appears in more than one drawing, it may be denoted by the same reference numeral in each drawing. Further, when detailed descriptions of known functions and components are considered to unnecessarily render the features of the present invention unclear, they may be omitted.

A system for confirming a location of a product according to the present invention includes a plurality of shelf areas, a location tag included in each shelf and transmitting an RFID signal, a reader included in each shelf and reading the RFID signal, and an RFID server analyzing information collected by the reader.

A method of confirming a location of a product in the system for confirming a location of a product having such a structure according to the present invention will be described with reference to drawings as indicated below.

FIG. 1 is a flowchart illustrating a method of confirming a location of a product in the system for confirming a location of a product using an RFID according to an exemplary embodiment of the invention.

Referring to FIG. 1, the reader confirms whether or not a location tag signal is received (S101). When the location tag signal is received, the RFID server determines that no product is on the corresponding shelf (S105).

When the location tag signal is not received, the reader confirms whether or not a signal of a product tag included in a product to transmit an RFID signal is received (S103).

When the signal of the product tag is received, the RFID server determines that a product is on the corresponding shelf (S107). When the signal of the product tag is not received, the RFID server determines that an error occurs in the reader (S109). When the product is located on the shelf in the present invention, the reader located in the shelf may be prevented from reading the location tag located in the shelf.

Now, the method of confirming a location of a product on a shelf will be described in detail through various exemplary embodiments regarding the presence of products located on each shelf.

Figure 2:
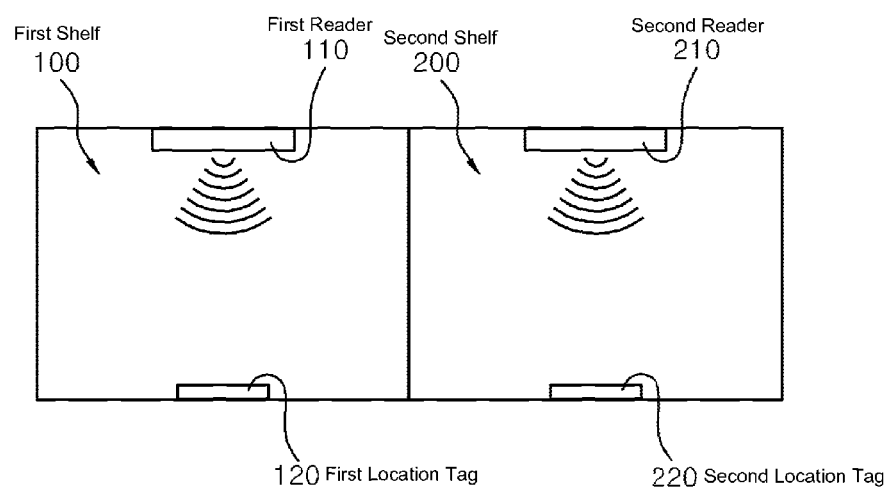
FIGS. 2 to 4 illustrate a method of confirming a location of a product in a system for confirming a location of a product using an RFID according to an exemplary embodiment of the present invention.
Figure 3:
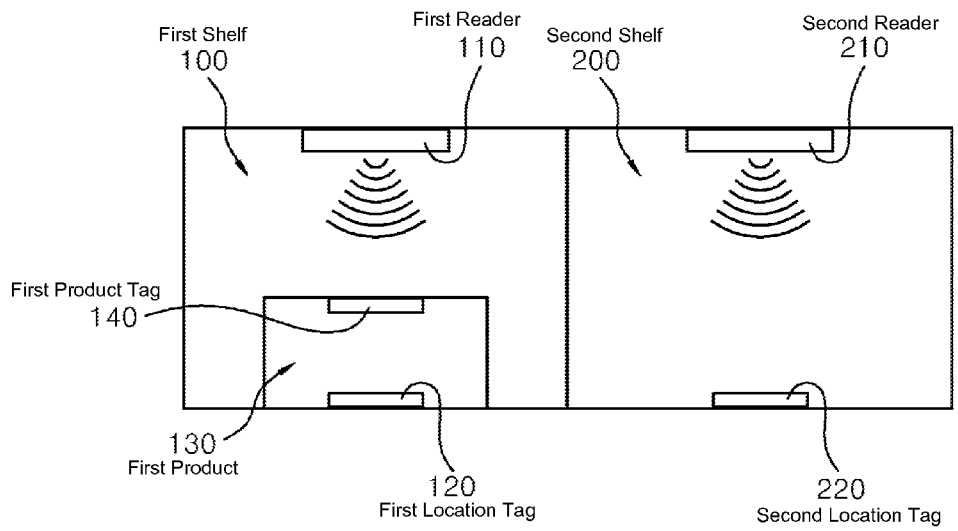
Figure 4:
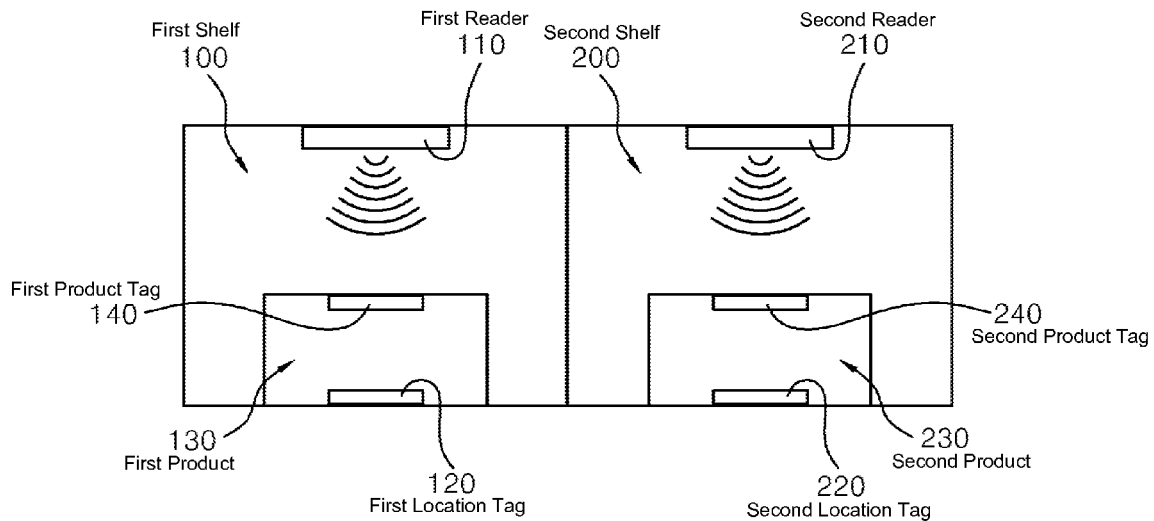

FIGS. 2 to 4 illustrate a method of confirming a location of a product in a system for confirming a location of a product using an RFID according to an exemplary embodiment of the present invention.

In FIG. 2, a system for confirming a location of a product including a first shelf 100 and a second shelf 200 adjacent to each other, a first reader 110 located in the first shelf 100, a first location tag 120 located in the first shelf 100, a second reader 210 located in the second shelf 200, and a second location tag 220 located in the second shelf 200 is illustrated.

FIG. 2 corresponds to an exemplary embodiment in which no product is on the first and second shelves 100 and 200.

Referring to FIG. 2, when the first reader 110 reads a signal of the first location tag 120 but it is unable to read a signal of the second location tag 220, an RFID server determines that no product is on the first shelf 100.

When the first reader 110 reads both the signals of the first and second location tags 120 and 220, the RFID server determines that no product is on the first shelf 100. Here, the RFID server reduces the intensity of an emitted radio wave of the first reader 110 until the signal of the second location tag 220 is not recognized. The RFID server according to an exemplary embodiment of the present invention may gradually reduce the intensity of the emitted radio wave of the first reader 110 to the intensity of a predetermined radio wave. Even if the intensity of the emitted radio wave of the first reader 110 reaches the minimum, when the first reader 110 recognizes the signal of the second location tag 220, the RFID server causes an alarm to be output.

When the first reader 110 is unable to read the signal of the first location tag 120 but reads the signal of the second location tag 220, the RFID server may determine that an error occurs in the first location tag 120.

When the first reader 110 is unable to read the signals of the first and second location tags 120 and 220, the RFID server may determine that an error occurs in the first reader 110.

When the second reader 210 reads the signal of the first location tag 120 signal but is unable to read the signal of the second location tag 220, the RFID server may determine that an error occurs in the second reader 220.

When the second reader 210 reads the signals of the first and second location tags 120 and 220, the RFID server may determine that no product is on the second shelf 200. Here, the RFID server reduces the intensity of the emitted radio wave of the second reader 210 until the first location tag 120 signal is not recognized. The RFID server according to an exemplary embodiment of the present invention may gradually reduce the intensity of the emitted radio wave of the second reader 210 to the intensity of a predetermined radio wave. Even if the intensity of the emitted radio wave of the second reader 210 reaches the minimum, when the second reader 210 recognizes the signal of the first location tag 120, the RFID server causes an alarm to be output.

When the second reader 210 is unable to read the signal of the first location tag 120 but reads the signal of the second location tag 220, the RFID server determines that no product is on the second shelf 200.

When the second reader 210 is unable to read the signals of the first and second location tags 120 and 220, the RFID server may determine that an error occurs in the second reader 210.

In FIG. 3, a system for confirming a location of a product comprising a first shelf 100 and a second shelf 200 adjacent to each other, a first reader 110 located in the first shelf 100, a first location tag 120 located in the first shelf 100, a second reader 210 located in the second shelf 200, and a second location tag 220 located in the second shelf 200 is illustrated.

FIG. 3 corresponds to an exemplary embodiment in which a first product 130 is on the first shelf 100, and no product is on the second shelf 200.

Referring to FIG. 3, when the first reader 110 reads a signal of the first product tag 140 located in the first product 130 but is unable to read a signal of the second location tag 220, the RFID server determines that a product is on the first shelf 100.

When the first reader 110 reads both the signal of the first product tag 140 located in the first product 130 and that of the second location tag 220, the RFID server determines that a product is on the first shelf 100.

When the first reader 110 is unable to read the signal of the first product tag 140 located in the first product 130 and that of the second location tag 220, the RFID server determines that an error occurs in the first reader 110.

When the first reader 110 is unable to read the signal of the first product tag 140 located in the first product 130 but reads the signal of the second location tag 220, the RFID server ignores a signal generated at this time since the second location tag 220 is mapped to the second reader 210.

When the second reader 210 reads the signal of the first product tag 140 located in the first product 130 and the signal of the second location tag 220, the RFID server determines that no product is on the second shelf 200.

When the second reader 210 is unable to read the signal of the first product tag 140 located in the first product 130 but reads the signal of the second location tag 220, the RFID server determines that no product is on the second shelf 200.

When the second reader 210 is unable to read the signal of the first product tag 140 located in the first product 130 and that of the second location tag 220, the RFID server determines that an error occurs in the second reader 210.

In FIG. 4, a system for confirming a location of a product including a first shelf 100 and a second shelf 200 adjacent to each other, a first reader 110 located in the first shelf 100, a first location tag 120 located in the first shelf 100, a second reader 210 located in the second shelf 200, and a second location tag 220 located in the second shelf 200 is illustrated.

FIG. 4 corresponds to an exemplary embodiment in which a first product 130 to which a first product tag 140 is attached is on the first shelf 100, and a second product 230 to which a second product tag 240 is attached is on the second shelf 200.

Referring to FIG. 4, when the first reader 110 reads both the first product tag 140 and the second product tag 240, an RFID server determines that a product is on the first shelf 100.

When the first reader 110 is unable to read the first product tag 140 and the second product tag 240, the RFID server determines that an error occurs in the first reader 110.

When the first reader 110 reads the first product tag 140 but is unable to read the second product tag 240, the RFID server determines that a product is on the first shelf 100.

When the first reader 110 is unable to read the first product tag 140 but reads the second product tag 240, the RFID server ignores a signal generated at this time since the second product tag 240 is read without reading the first location tag 120.

When the second reader 210 reads both the first and second product tags 140 and 240, the RFID server determines that a product is on the second shelf 200.

When the second reader 210 is unable to read the first and second product tags 140 and 240, the RFID server determines that an error occurs in the second reader 210.

When the second reader 210 reads the first product tag 140 but is unable to read the second product tag 240, the RFID server ignores a signal generated at this time since the first product tag 140 is read without reading the second location tag 220.

When the second reader 210 is unable to read the first product tag 140 but reads the second product tag 240, the RFID server determines that a product is on the second shelf 200.

Figure 5:
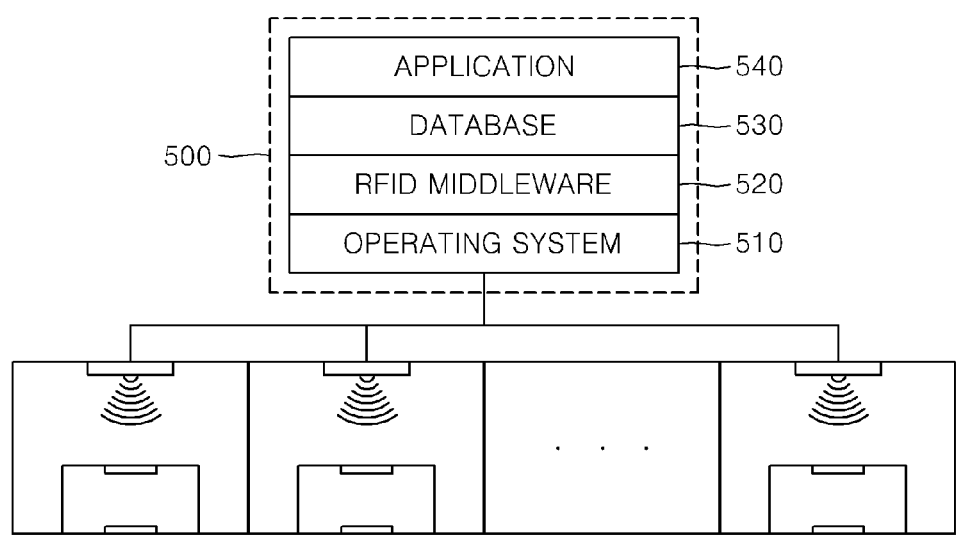
FIG. 5 is a block diagram illustrating a system for confirming a location of a product using an RFID according to an exemplary embodiment of the present invention.

FIG. 5 is a block diagram of a system for confirming a location of a product using an RFID according to an exemplary embodiment of the present invention.

Referring to FIG. 5, the system for confirming a location of a product using an RFID includes a plurality of shelf areas 1 to N, a location tag included in each shelf and transmitting an RFID signal, a reader included in each shelf and reading the RFID signal, and an RFID server 500 analyzing information collected by the reader. Here, the reader and the location tag located in each shelf may be mapped to each other to be managed. Also, when a product is on a shelf, the reader located in the shelf may be prevented from reading the location tag located in the shelf.

The RFID server 500 includes an operating system 510, a database 520 for storing data read from the reader, an RFID middleware 530 for analyzing and refining the data, and an application 540 for using the data refined and analyzed through the RFID middleware 530.

The RFID server 500 determines that no product is on the corresponding shelf when the reader connected to the RFID server 500 through a communication network receives a location tag signal.

When the reader is unable to receive the location tag signal but receives a product tag signal included in the product to transmit an RFID signal, the RFID server 500 determines that a product is on the corresponding shelf.

The RFID server 500 determines that an error occurs in the reader when the reader is unable to receive the signals of the location and product tags.

As set forth above, it is possible to an exact location of a product on a shelf can be recognized in real time using an RFID technique. Also, according to the present invention, a normal operation status of each RFID reader installed in a shelf area can be recognized in real time. In addition, it is unnecessary to install a separate radio wave jammer in order to prevent products loaded on the adjacent shelf area from being erroneously recognized, and thus cost can be reduced.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of confirming a location of a product on a shelf in a system including a plurality of shelf areas, a location tag included in each shelf area and transmitting a location tag radio-frequency identification (RFID) signal, a reader included in each shelf area and reading an RFID signal, and an RFID server analyzing information read by the reader, the method comprising:

confirming, by the reader, whether or not the location tag RFID signal is received;

in response to the reader receiving the location tag RFID signal, determining, by the RFID server, that no product is on the corresponding shelf area;

in response to the reader not receiving the location tag RFID signal, confirming, by the reader, whether or not a product tag RFID signal transmitted by a product tag included in a product is received;

in response to the reader not receiving the location tag RFID signal and receiving the product tag RFID signal, determining, by the RFID server, that the product is on the corresponding shelf area; and in response to the reader not receiving the location tag RFID signal and not receiving the product tag RFID signal, determining, by the RFID server, that an error occurs in the reader, wherein the reader located in the shelf area is prevented from receiving the location tag RFID signal transmitted by the location tag located in the shelf area when the product is located on the shelf area.

2. The method of claim 1, wherein in response to a first reader receiving a first location tag RFID signal but not receiving a second location tag RFID signal in the system including a first shelf area and a second shelf area adjacent thereto, the first reader located in the first shelf area, the first location tag located in the first shelf area, a second reader located in the second shelf area, and the second location tag located in the second shelf area, the RFID server determines that no product is on the first shelf area.

3. The method of claim 2, wherein in response to the first reader not reading the first location tag RFID signal but reading the second location tag RFID signal, the RFID server determines that an error occurs in the first location tag.

4. The method of claim 2, wherein in response to the first reader not reading the first location tag RFID signal and the second location tag RFID signal, the RFID server determines that an error occurs in the first reader.

5. The method of claim 2, wherein in response to the second reader reading the first location tag RFID signal but not reading the second location tag RFID signal, the RFID server determines that an error occurs in the second location tag.

6. The method of claim 2, wherein in response to the second reader not reading the first location tag RFID signal but reading the second location tag RFID signal, the RFID server determines that no product is on the second shelf area.

7. The method of claim 2, wherein in response to the second reader not reading the first location tag RFID signal and the second location tag RFID signal, the RFID server determines that an error occurs in the second reader.

8. The method of claim 2, wherein in response to the first reader reading the product tag RFID signal transmitted by the product tag located in the product but not reading the second location tag RFID signal, the RFID server determines that a product is on the first shelf area.

9. The method of claim 2, wherein in response to the first reader reading the product tag RFID signal transmitted by the product tag located in the product and the second location tag RFID signal, the RFID server determines that a product is on the first shelf area.

10. The method of claim 2, wherein in response to the second reader reading the product tag RFID signal transmitted by the product tag located in the product but not reading the first location tag RFID signal, the RFID server determines that a product is on the second shelf area.

11. The method of claim 2, wherein in response to the second reader reading the product tag RFID signal transmitted by the product tag located in the product and the first location tag RFID signal, the RFID server determines that a product is on the second shelf area.

12. The method of claim 2, wherein in response to the first reader receiving the first location tag RFID signal and the second location tag RFID signal, the RFID server determines that no product is on the first shelf area.

13. The method of claim 12, wherein in response to the first reader recognizing the second location tag RFID signal even though the intensity of the radio wave emitted by the first reader reaches the minimum, the RFID server causes an alarm to be output.

14. The method of claim 12, wherein the RFID server reduces the intensity of a radio wave emitted by the first reader until the second location tag RFID signal is not recognized by the first reader.

15. The method of claim 14, wherein the RFID server gradually reduces the intensity of the radio wave emitted by the first reader to a predetermined intensity.

16. The method of claim 2, wherein in response to the second reader reading the first location tag RFID signal and the second location tag RFID signal, the RFID server determines that no product is on the second shelf area.

17. The method of claim 16, wherein the RFID server reduces the intensity of a radio wave emitted by the second reader until the first location tag RFID signal is not recognized by the second reader.

18. The method of claim 17, wherein the RFID server gradually reduces the intensity of the radio wave emitted by the second reader to a predetermined intensity.

19. The method of claim 17, wherein in response to the second reader recognizing the first location tag RFID signal even though the intensity of the radio wave emitted by the second reader reaches the minimum, the RFID server causes an alarm to be output.

20. A system for confirming a location of a product using radio-frequency identification (RFID), the system comprising:
- a plurality of shelf areas;
- a location tag included in each shelf area and transmitting a location tag RFID signal;
- a reader included in each shelf area and reading the RFID signal; and
- an RFID server analyzing data read by the reader and including an operating system, a database for storing data read by the reader, an RFID middleware for analyzing and refining the data read by the reader, and an application for using the data refined and analyzed through the RFID middleware, wherein:
- the reader confirms whether or not the location tag RFID signal is received;
- the RFID server, in response to the reader receiving the location tag RFID signal, determines that no product is on the corresponding shelf area;
- the reader, in response to not receiving the location tag RFID signal, confirms whether or not a product tag RFID signal transmitted by a product tag included in the product is received;
- the RFID server, in response to the reader not receiving the location tag RFID signal and receiving the product tag RFID signal transmitted by the product tag included in the product, determines that the product is on the corresponding shelf area;
- the RFID server, in response to the reader not receiving the location tag RFID signal and not receiving the product tag RFID signal, determines that an error occurs in the reader; and
- wherein the reader located in the shelf area is prevented from receiving the location tag RFID signal transmitted by the location tag located in the shelf area when the product is located on the shelf area.

21. The system of claim 20, wherein the reader and the location tag located in each shelf area are mapped to each other to be managed.

* * * * *